(12) United States Patent
Adcock et al.

(10) Patent No.: US 7,440,947 B2
(45) Date of Patent: Oct. 21, 2008

(54) SYSTEM AND METHOD FOR IDENTIFYING QUERY-RELEVANT KEYWORDS IN DOCUMENTS WITH LATENT SEMANTIC ANALYSIS

(75) Inventors: John E. Adcock, Menlo Park, CA (US); Matthew Cooper, San Francisco, CA (US); Andreas Girgensohn, Menlo Park, CA (US); Lynn D. Wilcox, Palo Alto, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 557 days.

(21) Appl. No.: 10/987,377

(22) Filed: Nov. 12, 2004

(65) Prior Publication Data

US 2006/0106767 A1    May 18, 2006

(51) Int. Cl.
*G06F 7/00*    (2006.01)
(52) U.S. Cl. .................................... 707/7; 707/3; 707/6
(58) Field of Classification Search .................. 707/3, 707/5, 6, 7, 101, 104.1
See application file for complete search history.

(56) References Cited

U.S. PATENT DOCUMENTS

| | | | | |
|---|---|---|---|---|
| 5,694,594 | A * | 12/1997 | Chang | 707/6 |
| 5,703,655 | A * | 12/1997 | Corey et al. | 348/468 |
| 6,847,966 | B1 * | 1/2005 | Sommer et al. | 707/5 |
| 2002/0107735 | A1 * | 8/2002 | Henkin et al. | 705/14 |
| 2003/0055810 | A1 * | 3/2003 | Cragun et al. | 707/1 |
| 2004/0117725 | A1 * | 6/2004 | Chen et al. | 715/500 |
| 2004/0122657 | A1 * | 6/2004 | Brants et al. | 704/9 |
| 2005/0022114 | A1 * | 1/2005 | Shanahan et al. | 715/513 |
| 2005/0210006 | A1 * | 9/2005 | Robertson et al. | 707/3 |

OTHER PUBLICATIONS

Mani, Inderjeet and Eric Bloedorn, "Summarizing Similarities and Differences Among Related Documents", Information Retrieval, vol. 1, Nos. 1-2, pp. 35-67 (1999).
Deerwester, S., Dumais, S. T., Furnas, G. W., Landauer, T. K., Harshman, R., "Indexing by Latent Semantic Analysis." Journal of the American Society for Information Science, 41-6, pp. 391-407 (1990).
Berry, M.W., S. T. Dumais and G. W. O'Brien, "Using Linear Algebra for Intelligent Information Retrieval", Review 37:4, pp. 573-595 (1995).
Landauer, T. K. and S. T. Dumais, "A Solution to Plato's Problem: The Latent Semantic Analysis Theory of Acquisition, Induction and Representation of Knowledge", Psychological Review, 104, pp. 211-240 (1997).

* cited by examiner

*Primary Examiner*—Leslie Wong
*Assistant Examiner*—Dung K Chau
(74) *Attorney, Agent, or Firm*—Fliesler Meyer LLP

(57) ABSTRACT

A system and method for identifying query-related keywords in documents found in a search using latent semantic analysis. The documents are represented as a document term matrix $\underline{M}$ containing one or more document term-weight vectors d, which may be term-frequency (tf) vectors or term-frequency inverse-document-frequency (tf-idf) vectors. This matrix is subjected to a truncated singular value decomposition. The resulting transform matrix $\underline{U}$ can be used to project a query term-weight vector q into the reduced N-dimensional space, followed by its expansion back into the full vector space using the inverse of $\underline{U}$.

To perform a search, the similarity of $q_{expanded}$ is measured relative to each candidate document vector in this space. Exemplary similarity functions are dot product and cosine similarity. Keywords are selected with the highest values in $q_{expanded}$ that are also comprised in at least one document. Matching keywords from the query may be highlighted in the search results.

20 Claims, 5 Drawing Sheets

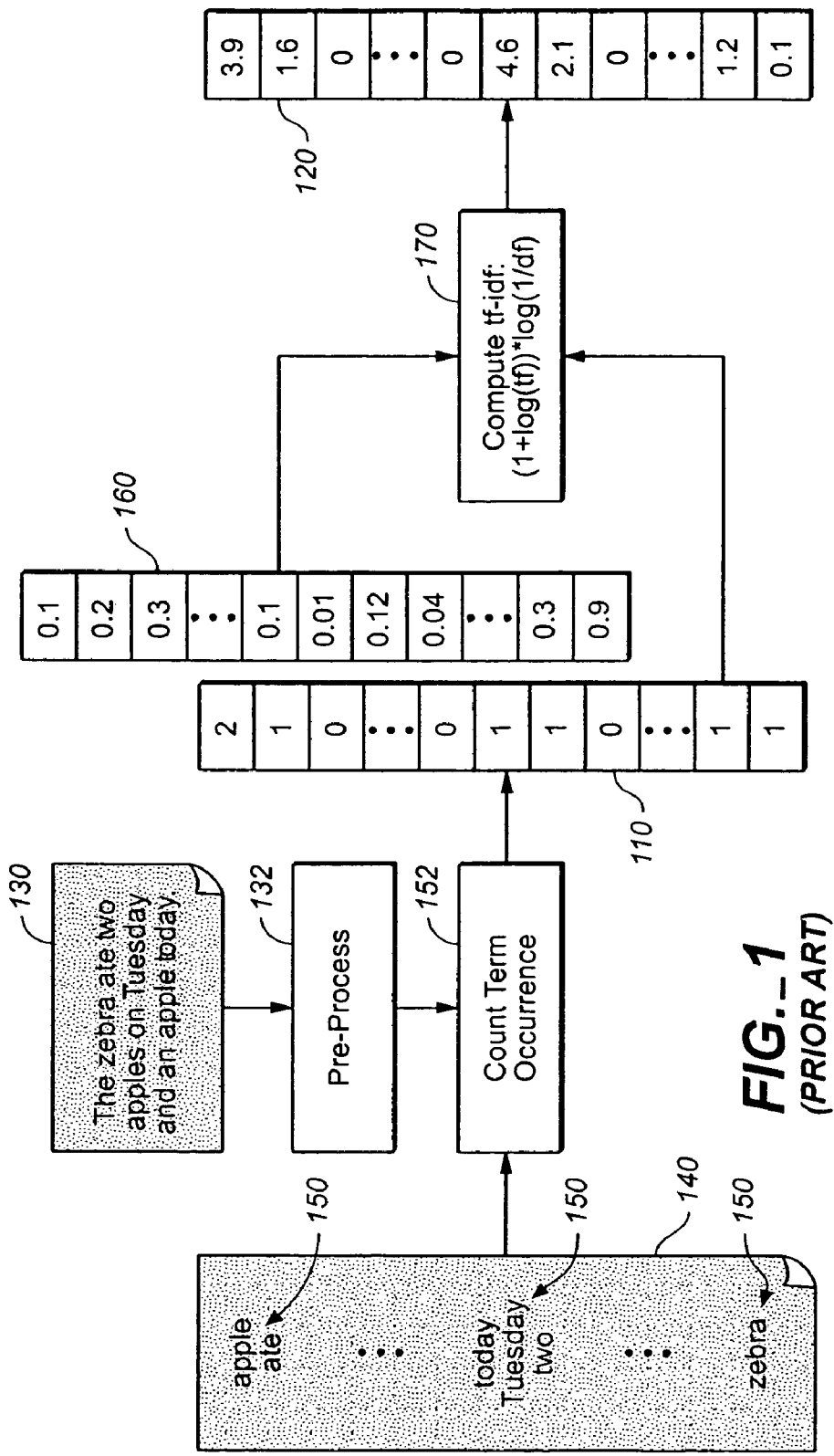
FIG._1 (PRIOR ART)

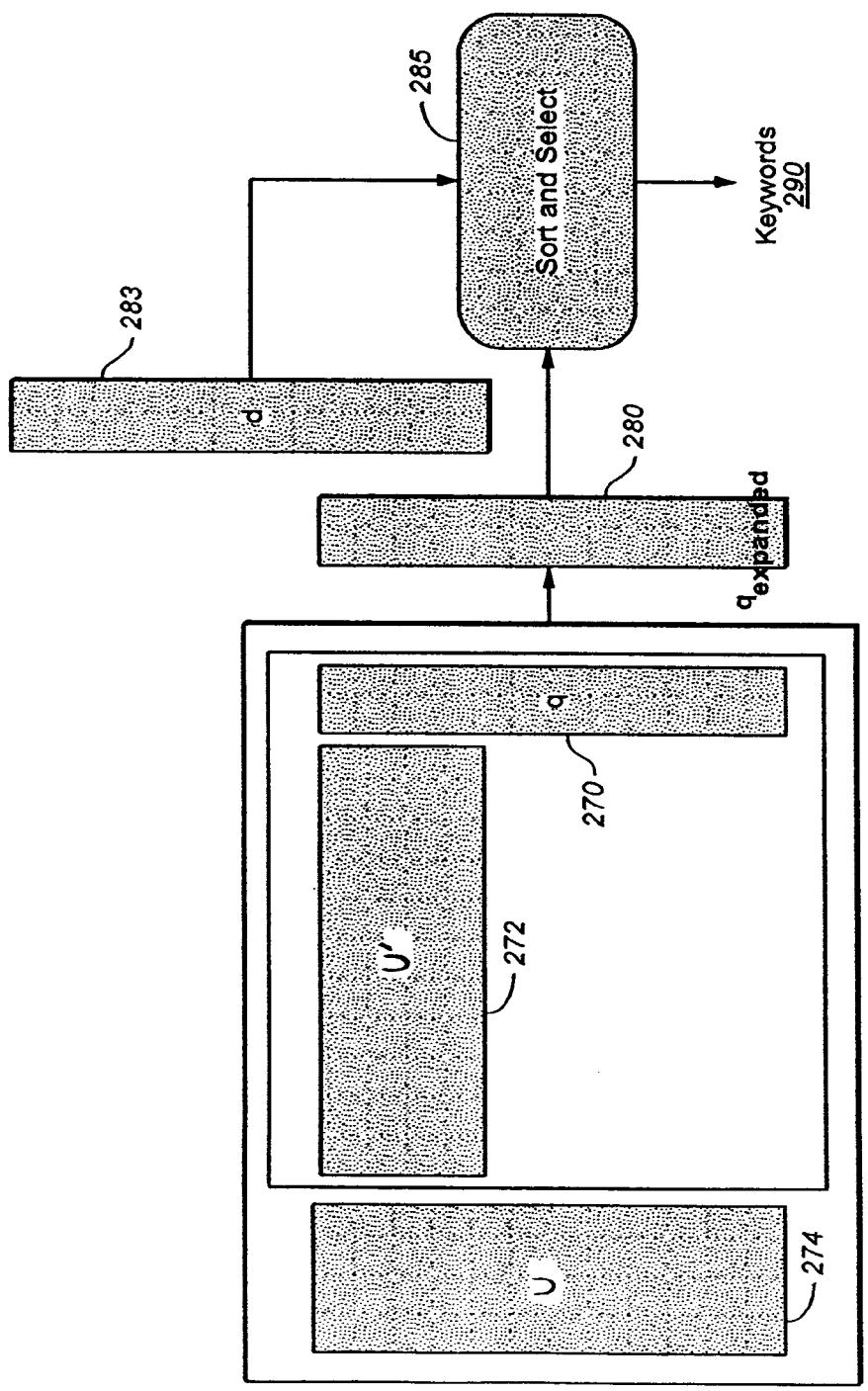
FIG._2

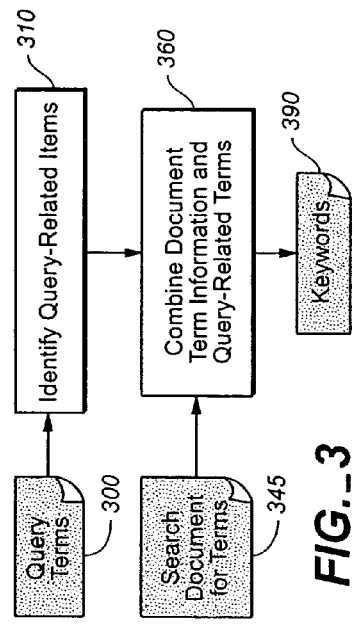
FIG._3
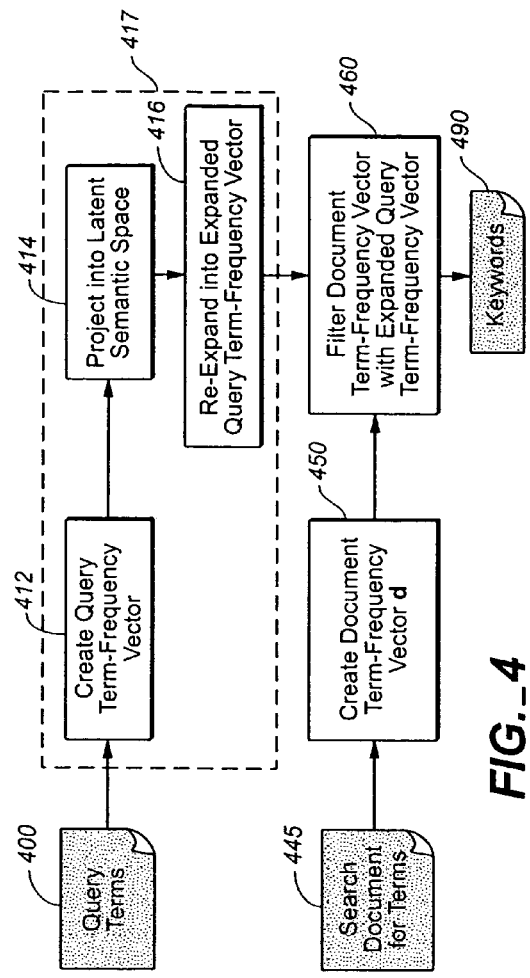
FIG._4

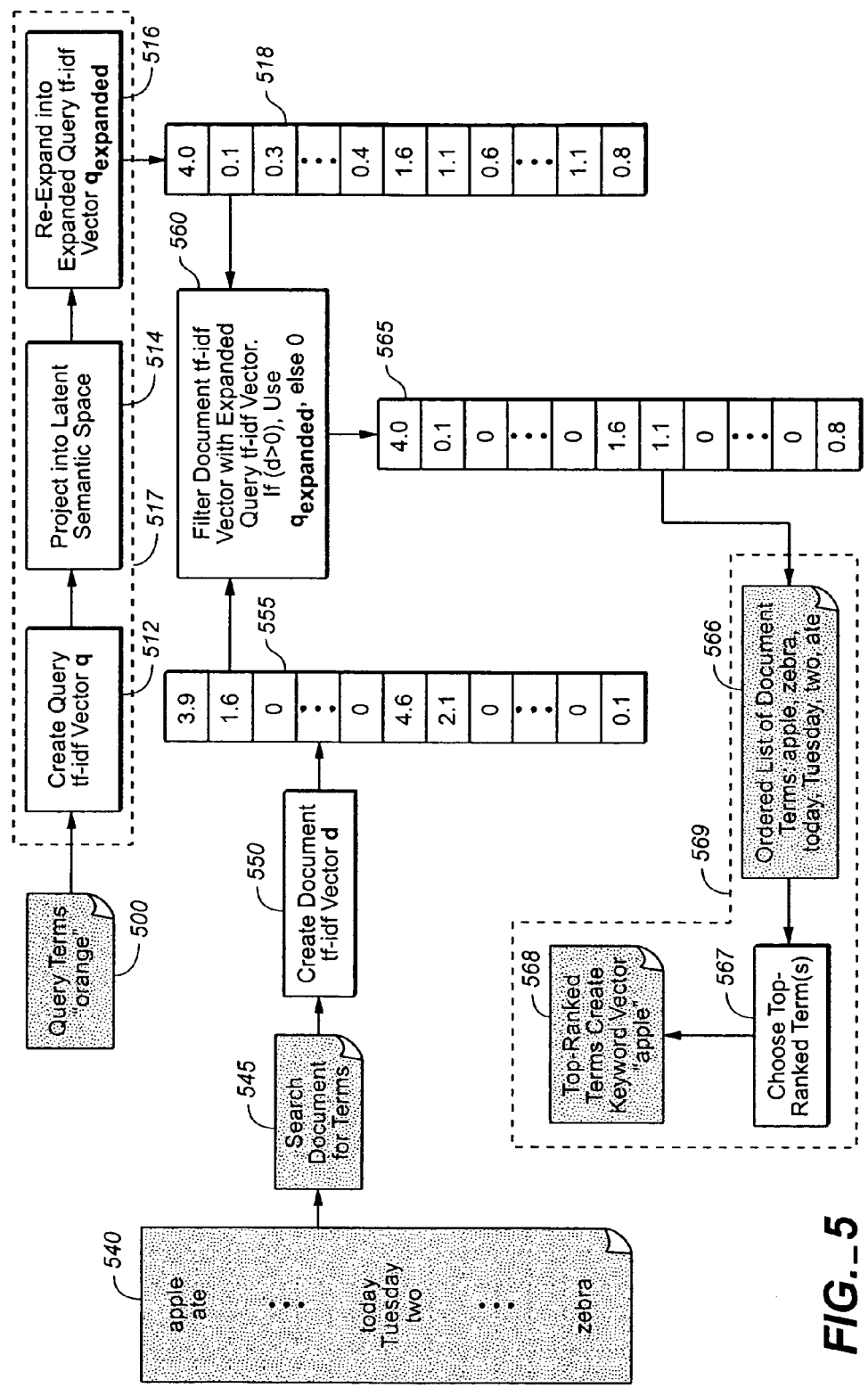
FIG._5

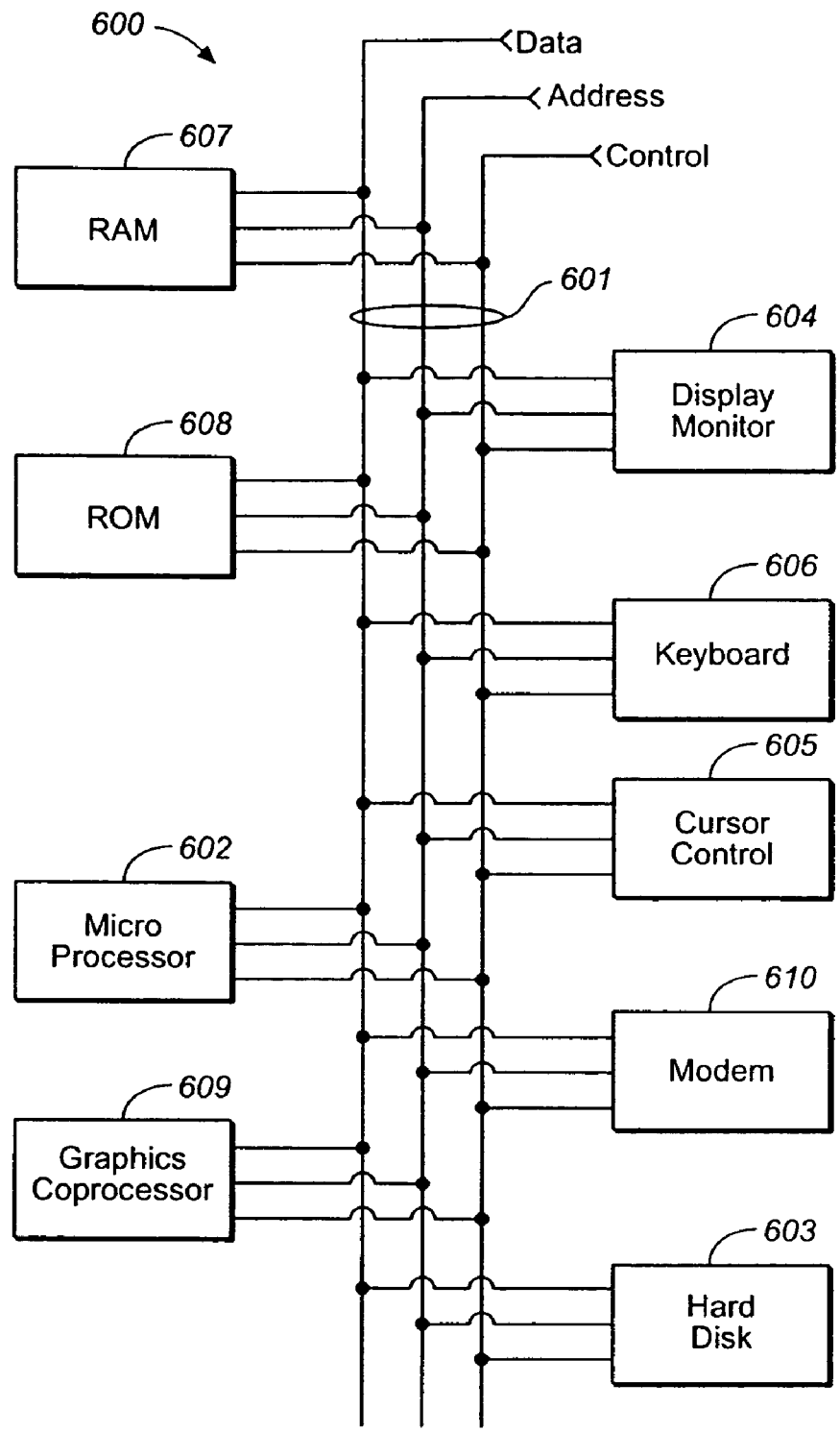
FIG._6

SYSTEM AND METHOD FOR IDENTIFYING QUERY-RELEVANT KEYWORDS IN DOCUMENTS WITH LATENT SEMANTIC ANALYSIS

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

FIELD OF THE INVENTION

The invention is in the field of automatic media analysis and is related to systems and methods for identifying keywords, and particularly to a system and method for identifying query-relevant keywords in documents with latent semantic analysis.

BACKGROUND

In traditional text search systems (e.g., Google), it is common to highlight the query terms occurring in the retrieved documents to give the user feedback. However, this approach does not work when using Latent Semantic Analysis (LSA). LSA is the basis of a variety of document analysis and search techniques. One aspect of using LSA for text-based searches is that a document may be deemed highly relevant to the specified query terms and yet may not actually contain those terms.

There is a large body of work in text processing and information retrieval, much of it based upon LSA and similar techniques, including a topic of research commonly termed query-related summarization. The invention described here falls generally in that area, where identifying terms in document A that are relevant to another document B is in some sense a form of summarization of A. In general, the works in this field cover more traditional forms of summarization, i.e., identifying key sentences in the source text to use as a summary.

LSA is used to identify synonyms for single search term queries by finding closely related terms in the latent semantic space.

It is desirable to develop a system and method for identifying query-relevant keywords in documents with latent semantic analysis, where a query may comprise more than one search term. It is also desirable to filter the resulting list of query-relevant keywords according to the context of the query. It is also desirable to identify keywords in the found document that are most closely related to the query terms, regardless of whether the keywords appear in the set of query terms.

SUMMARY

When latent semantic analysis (LSA) or another fuzzy search technique is used as the basis for a document search system, a query specified as a set of terms may result in a relevant document that does not contain any of the exact terms used in the query. It is useful to provide feedback to the user to indicate why a particular document was deemed relevant to the query. A method is described to identify keywords in the found document that are most closely related to the query terms, regardless of whether the keywords appear in the set of query terms.

The present method expands multiple-word queries as well as single-word queries. The resulting synonym list is filtered by the context of the search document. In accordance with the invention, a collection of documents are represented as a matrix $\underline{M}$ of document term-weight vector d, which may be document term-frequency (tf) vectors or document term-frequency inverse-document-frequency (tf-idf) vectors. The term-weight matrix $\underline{M}$ has one column for each document and one row for each term.

The term-weight matrix $\underline{M}$ comprising the document term-weight vectors d is sparse because each document only contains a subset of the terms occurring in any of the documents. The matrix can be projected into a reduced dimension space that is presumed to capture semantic information about the documents used to build it.

The term-weight matrix $\underline{M}$ of document term-weight vectors d is subjected to a truncated singular value decomposition (SVD). That is, the original term-weight matrix $\underline{M}$ is approximated by a product of 3 matrices $\underline{U}\ \underline{S}\ \underline{V}'$, where $\underline{S}$ is a square diagonal matrix, and $\underline{U}$ and $\underline{V}$ are unitary matrices. The resulting transform matrix $\underline{U}$ can be used to project new query term-weight vectors into the reduced N-dimensional space.

The query term-weight vector q (which is likely to have very few entries since most user-entered queries use few terms) is projected into the reduced dimension latent semantic space using the matrix $\underline{U}$, producing a reduced query term-weight vector $q_{reduced}$. Subsequently, the reduced query term-weight vector $q_{reduced}$ is expanded back into the full term-weight vector space using the inverse of $\underline{U}$ which, because $\underline{U}$ is unitary, is $\underline{U}'$ according to the equation $q_{expanded} = q_{reduced} * \underline{U} = (q * \underline{U}') * \underline{U}$, where $q_{expanded}$ is the expanded, dense, smoothed final result. It is noted that in general, q is a column vector and q' is the transpose, or a row vector.

Next, to identify keywords, terms are eliminated from the expanded query term-weight vector $q_{expanded}$ that do not occur in the search document. Subsequently, a number of the remaining terms with the highest corresponding values in $q_{expanded}$ are selected as query-related keywords. These terms can now be used to highlight the context of the similarity between the query and the returned document.

An equivalent way to express this process is to first compute the similarity between the query and every term in the entire dictionary. This is what the computation of $q_{expanded}$ using the latent semantic space accomplishes. The next step is to choose the terms most similar to the query that also occur in the search result document as the set of query-related keywords. One possible similarity function is the dot product; when the reduced dimension query term-weight vector is multiplied by $\underline{U}'$, the resulting similarity vector is a vector of dot products. A different similarity measure, such as cosine similarity, can be used here instead. In this case the nth term in the $q_{expanded}$ vector would be formed by computing the cosine similarity (or other similarity function) between the reduced-dimension query term-weight vector $q_{reduced} = \underline{U}' * q$ and row n of U.

Alternatively, the term-by-term product of the expanded query term-weight vector $q_{expanded}$ and the document term-weight vector d is taken, and the terms corresponding to some number of the largest resulting values are used as keywords. By taking the product the relative importance of the each term to both the query and the document is incorporated.

Embodiments of the invention make use of a pre-search segmentation of each video into shots and stories. Stories are created by finding topic changes in the time-aligned text. Stories are used as the documents for the video search.

BRIEF DESCRIPTION OF THE DRAWINGS

Preferred embodiment(s) of the present invention will be described in detail based on the following figures, wherein:

FIG. 1 is a schematic diagram that illustrates according to prior art the generation of a term-frequency vector 110 and a term frequency-inverse document frequency (tf-idf) vector 120 for one specific document 130 comprised in a collection of documents;

FIG. 2 is a schematic diagram that illustrates the projection of the query term-weight vector q into a reduced dimension space using the matrix $\underline{U}$, followed by its expansion back into the full term-weight vector space using the inverse of $\underline{U}$;

FIG. 3 is a flow chart that illustrates an overview of the process of selecting keywords;

FIG. 4 is a flow chart that illustrates the process of selecting keywords for the case in which term-weight vectors are term-frequency vectors;

FIG. 5 is a flow chart that illustrates the process of selecting keywords for the case in which term-weight vectors are tf-idf vectors and provides further detail on how a keyword vector is generated; and FIG. 6 is a block diagram that illustrates a general purpose computer architecture suitable for performing the methods of the present invention.

DETAILED DESCRIPTION

When latent semantic analysis (LSA) or another fuzzy search technique is used as the basis for a document search system, a query specified as a set of terms may result in a relevant document that does not contain any of the exact terms used in the query. It is useful to provide feedback to the user to indicate why a particular document was deemed relevant to the query. As an example, a query "orange" might reasonably return documents that do not contain this term but are closely related to the query because they contain a very strongly correlated term such as "apple" or "ate". It is useful to communicate to the user that these terms from the returned document were highly relevant to the query.

A method is described to identify terms in the found document that are most closely related to the query terms, regardless of whether the keywords appear in the set of query terms.

The present method expands multiple-word queries as well as single-word queries. The resulting synonym list is filtered by the context of the search document. In accordance with the invention, a collection of documents are represented as a term-weight matrix $\underline{M}$ of document term-weight vectors d, which may be document term-frequency (tf) vectors or document term-frequency inverse-document-frequency (tf-idf) vectors.

In embodiments involving term-frequencies (tf), each matrix column represents a document and each matrix row represents a term. Thus, the matrix has as many columns as the number of documents in the collection and as many rows as the number of unique terms occurring in at least one document. Each column in the matrix is a vector describing the term frequency in one document. The value at row t and column d is the term-frequency for term #t in document d (tf case).

In tf-idf embodiments, each value in the term-frequency inverse-document-frequency matrix is a function of the term-frequency and the overall frequency of term #t in the complete set of documents. The tf-idf function may take many forms. One exemplary form of this function is tf-idf=(1.0+log(tf))*log(idf)=(1.0+log(tf))*log(1/df), where tf is the number of times term #t occurs in document d and df is the fraction of documents in which term #t occurs. In creating a tf-idf vector, first a tf vector and an inverse-document-term-frequency vector idf are created, and then the appropriate formula is applied to determine the elements of the tf-idf vector.

The term-weight matrix $\underline{M}$ is sparse because each document only contains a subset of the terms occurring in any of the documents. The matrix also contains patterns of co-occurrences where combinations of terms appear in several documents. The matrix can be projected into a reduced dimension space that is presumed to capture semantic information about the documents used to build it.

According to one set of embodiments, the term-weight matrix $\underline{M}$ of document term-weight vectors d is subjected to a truncated singular value decomposition (SVD). That is, the original term-weight matrix $\underline{M}$ of T rows and D columns is approximated by a product of 3 matrices $\underline{U}\,\underline{S}\,\underline{V}'$, where $\underline{S}$ is a square diagonal matrix of size N where the choice of N is arbitrary but typically N<<T and N<<D, and $\underline{U}$ and $\underline{V}$ are unitary matrices of dimension N by T and D by N, respectively. The resulting transform matrix $\underline{U}$ can be used to project new query term-weight vectors into the reduced N-dimensional space.

Each document term-weight vector d and the resulting matrix $\underline{M}$ is computed once and then stored. Storing this matrix or a similar representation serves a similar purpose to standard text retrieval methods. New documents can be added incrementally to the matrix by the approximation of ignoring all terms in the new documents that do not exist in at least one of the old documents. The new documents would then not contribute to the computation of the term-weight matrix $\underline{M}$ but would use the mapping established by a computation that used only the old documents. The document term-weight matrix $\underline{M}$ and the transform matrix $\underline{U}$ can be periodically recomputed from scratch to more completely incorporate the new documents.

The query term-weight vector q is likely to have very few entries, i.e., to be quite sparse, since most user-entered queries use few terms. The query term-weight vector q is projected into the reduced dimension latent semantic space using the matrix $\underline{U}'$, producing a reduced query term-weight vector $q_{reduced}$. Subsequently, the query term-weight vector q is expanded back into the full term-weight vector space using the inverse of $\underline{U}'$ which, because $\underline{U}$ is unitary, is $\underline{U}$, according to the equation $q_{expanded} = q_{reduced} * \underline{U} = (q * \underline{U}') * \underline{U}$, where q is the (presumably quite sparse) query term-weight vector formed from the original query terms, $q_{reduced}$ is the reduced result of the projection into latent semantic space and $q_{expanded}$ is the expanded, dense, smoothed final result.

Next, to identify keywords, terms are eliminated from the expanded query term-weight vector $q_{expanded}$ that do not occur in the search document. Subsequently, a number of the remaining terms with the highest corresponding values in $q_{expanded}$, i.e., the terms with the highest similarity to the query, are selected as query-related keywords. These terms can now be used to highlight the context of the similarity between the query and the returned document.

An equivalent way to express this process is to first compute the similarity between the query, and every term in the dictionary. This is what the computation of $q_{expanded}$ using the latent semantic space accomplishes. The next step is to choose the terms most similar to the query that also occur in the search result document as the set of query-related keywords. According to one embodiment, the similarity function used is the dot product; when the reduced dimension query term-weight vector is multiplied by U̲, the resulting similarity vector is a vector of dot products. A different similarity measure, like cosine similarity can be used here instead. In this case, the nth term in the $q_{expanded}$ vector would be formed by computing the cosine similarity (or other similarity function) between the reduced-dimension query term-weight vector ($q_{reduced}$=U̲'*q and row t of U.

In another set of embodiments, the term-by-term product of the expanded query term-weight vector $q_{expanded}$ and the term-weight vector is taken, and the terms corresponding to some number of the largest resulting values are used as keywords. In this embodiment, by taking the product, the relative importance of the each term to both the query and the document is incorporated.

According to another set of embodiments, matching keywords from the query may be highlighted in the search results to provide an indication of the context in which the document and the query matched.

Embodiments of the invention make use of a pre-search segmentation of each video into shots and stories. Stories are created by finding topic changes in the time-aligned text. Stories are used as the documents for the video search.

FIG. 1 is a schematic diagram that illustrates the generation of a term-frequency vector 110 and a term frequency-inverse document frequency (tf-idf) vector 120 for one specific document 130 comprised in a collection of documents. The document 130 consists of the sentence, "The zebra ate two apples on Tuesday and an apple today." This text is passed through standard text pre-processing 132 to create a dictionary 140 containing all relevant terms 150 appearing in one or more documents 130 found in the query. Relevant terms 150 are all terms 150 remaining after superfluous terms such as "the" and "and" are eliminated and other terms 150 are reduced to a common form where applicable. Superfluous terms are not sufficiently helpful in keyword identification to justify their inclusion in the dictionary 140. Reduction of other terms 150 to their common form promotes the accuracy of keyword identification by eliminating apparent but unhelpful "differences" such as the distinction between a singular and plural noun. For example, plural nouns such as "apples" are typically changed to the singular form of "apple." The number of times each term 150 occurs is counted 152, and a term frequency vector 110 is thereby created that corresponds with the dictionary 140. In this example, the only term that has a frequency greater than 1 is the term "apple." A document frequency vector 160 is compiled by determining the fraction of documents found in the search that contain each dictionary term. In this example, the first term 150 in the dictionary, "apple," occurs in 0.1 of all documents, and the last term 150, "zebra," appears in 0.9 of all documents. The computation 170 of the tf-idf function is pictured according to one exemplary formula. A tf-idf vector 120 is thereby generated. The effect of this process is that in the final tf-idf vector 120, the value for the term "apple" has been amplified because it appears twice in the search and because it is relatively rare in the collection of documents, and the value for the term "zebra" has been attenuated because this term is so widespread in the collection of documents 130.

FIG. 2 is a schematic diagram that illustrates a method for identifying a set of query-relevant keywords comprised in one or more selected documents, wherein the query need not comprise the keywords. As a preliminary step, a term-weight matrix M̲ of document term-weight vector d is subjected to a truncated singular value decomposition (SVD). That is, the original term-weight matrix M̲ of T rows and D columns is approximated by a product of 3 matrices U̲ S̲ V̲', where S̲ is a square diagonal matrix of size N where the choice of N is arbitrary but typically N<<T and N<<D, and U̲ and V̲ are unitary matrices of dimension T by N and D by N, respectively. The resulting transform matrix U̲ can be used to project new query term-weight vectors into the reduced N-dimensional space.

A query term-weight vector 270 is projected into a reduced dimension space using the matrix 272, which is also described as U̲', then expanded back into the full term-weight vector space using the matrix 274, the inverse of U̲' which, because U̲ is unitary, is U̲: $q_{expanded}$=(U̲'*q)*U.

Then, to identify keywords, a sort and select process 285 occurs. Terms are eliminated from $q_{expanded}$ that do not occur in the search document. Subsequently, a number of the remaining terms with the highest values in $q_{expanded}$ are selected to produce the final result: a set of query-related keywords 290. In one embodiment, these steps may be achieved by selecting terms with the highest values in $q_{expanded}$ that are also non-zero in a document term-weight vector 283, which is also described as d. The resultant keywords 290 can now be used to highlight the context of the similarity between the query and the returned document.

FIG. 3 is a flow chart that illustrates an overview of the process of selecting keywords. Query terms are received in step 300. In step 310, terms related to query terms are identified. In step 345, a document is searched for terms, both query terms and related terms. In step 360, the document term information and the information on terms related to query terms are combined. In step 370, keywords are generated from the results.

FIG. 4 is a flow chart that illustrates the process of selecting keywords for the case in which term-weight vectors are term-frequency vectors, i.e., query term-frequency vectors and document term-frequency vectors are generated. Query terms are received in step 400. In step 412, query terms are converted into a query term-frequency vector q. In step 414, the query term-frequency vector q is projected into the reduced dimension latent semantic space. In step 416, the query term-frequency vector q is re-expanded back out of latent semantic space, creating an expanded query term-frequency vector $q_{expanded}$. The steps 412, 414, and 416 in this figure, i.e., the three steps located inside the dashed line 417, collectively constitute a special case of step 310 in FIG. 3. In step 445, a document is searched for terms, both query terms and related terms. In step 450, a document term-frequency vector is created based on the results of the search. In step 460, the document term-frequency vector is filtered by reference to the expanded query term-frequency vector $q_{expanded}$, with the similarity of each candidate document term-frequency vector being measured with respect to the expanded query term-frequency vector $q_{expanded}$. Exemplary similarity functions are dot product and cosine similarity. A configurable number of most similar documents is returned as the results of the search. Step 460 constitutes a special case of step 360 in FIG. 3. In step 470, keywords are generated from the results.

FIG. 5 is a flow chart that illustrates the process of selecting keywords for the case in which term-weight vectors are tf-idf vectors, i.e., query tf-idf vectors and document tf-idf vectors are generated. FIG. 5 also provides further detail on how a keyword vector is generated. The query used is "orange," which does not appear in the document shown as an example. The terms "apple" and "orange" are closely related in this particular semantic space. Query terms are received in step 500. In step 512, query terms are converted into a query tf-idf vector q. In step 514, the query tf-idf vector q is projected into the reduced dimension latent semantic space, producing a reduced query tf-idf vector $q_{reduced}$. In step 516, the reduced query tf-idf vector $q_{reduced}$ is re-expanded back out of latent semantic space, creating an expanded query tf-idf vector 518, also known as $q_{expanded}$, with exemplary values illustrated. The steps 512, 514, and 516 in this figure, i.e., the three steps located inside the dashed line 517, collectively constitute a special case of step 310 in FIG. 3. In step 545, a document is searched for terms in dictionary 540, both query terms and related terms. In step 550, a document tf-idf vector 555 is created based on the results of the search, with exemplary values as indicated. This step is displayed in much greater detail in FIG. 1. In step 560, the document tf-idf vector 555 is filtered by reference to the expanded query tf-idf vector 518, with the similarity of each candidate document tf-idf vector 555 being measured with respect to the expanded query tf-idf vector 518. Exemplary similarity functions are dot product and cosine similarity. As one other example, if the term appears in at least one document, then the term becomes a component of the keyword vector, and if the term is not contained in any document, then the corresponding value of the keyword vector is zero. This embodiment is illustrated by the keyword vector 565 obtained, with exemplary values as indicated, after the filtering step 560. A configurable number of most similar documents is returned as the results of the search. Step 560 constitutes a special case of step 360 in FIG. 3.

In step 566, an ordered list of document terms is generated is generated by applying the keyword vector 565 to the dictionary 540. In step 568, the top ranked term(s) are selected. In step 569, a keyword vector is created using these top ranked term(s), such as "apple." The steps 566, 567, and 569 in this figure, i.e., the three steps located inside the dotted line 569, collectively constitute a more detailed special case of step 470 in FIG. 4 and of step 370 in FIG. 3.

System Implementation:

FIG. 6 is a block diagram that illustrates a general purpose computer system 600 suitable for implementing the methods according to the present invention. The general purpose computer system 600 includes one or more processors 602. The cursor control device 605 is implemented as a mouse, a joy stick, a series of buttons, or any other input device which allows a user to control position of a cursor or pointer on the display monitor 604. The general purpose computer may also include random access memory 607, external storage 603, ROM memory 608, a keyboard 606, a modem 610 and a graphics co-processor 609. The cursor control device 605 and/or the keyboard 606 are exemplary user interfaces for receiving user input according to the present invention. All of the elements of the general purpose computer 600 are optionally tied together by a common bus 601 for transporting data between the various elements. The bus 601 typically includes data, address, and control signals. Although the general purpose computer 600 illustrated in FIG. 6 includes a single data bus 601 which ties together all of the elements of the general purpose computer 600, there is no requirement that there be a single communication bus 601 which connects the various elements of the general purpose computer 600. For example, the one or more processors 602, RAM 607, ROM 608, and graphics co-processor 609 are alternatively tied together with a data bus while the hard disk 603, modem 610, keyboard 606, display monitor 604, and cursor control device 605 are connected together with a second data bus (not shown). In this case, the first data bus 601 and the second data bus (not shown) are linked by a bi-directional bus interface (not shown). Alternatively, some of the elements, such as the one or more processors 602 and graphics co-processor 609, are connected to both the first data bus 601 and the second data bus (not shown), and communication between the first and second data bus occurs through the one or more processors 602 and graphics co-processor 609. The methods of the present invention are thus executable on any general purpose computer system such as the 600 illustrated in FIG. 6, but there is clearly no limitation that this computer system is the only one which can execute the methods of the present invention.

In a typical implementation, the operator uses a computer system that includes a computer display, and some form of graphical interface executing thereon, for example, a Unix Windows environment, a Mac OS, or a Microsoft Windows environment, or some other graphical application environment. It will be evident to one skilled in the art that embodiments of the invention can be equally used with other forms of graphical user interface (GUI).

Appropriate software coding can readily be prepared by skilled programmers based on the teachings of the present disclosure, as will be apparent to those skilled in the software art. Embodiments of the invention may also be implemented by the preparation of application specific integrated circuits or by interconnecting an appropriate network of conventional component circuits, as will be readily apparent to those skilled in the art.

Embodiments of the present invention include a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Embodiments of the present invention include software, stored on any one of the computer readable medium (media), for controlling both the hardware of the general purpose/specialized computer or microprocessor, and for enabling the computer or microprocessor to interact with a human operator or other mechanism utilizing the results of the present invention. Such software may include, but is not limited to, device drivers, operating systems, and user applications. Ultimately, such computer readable media further includes software for executing the present invention, as described above.

Stored on any one of the computer readable medium (media), embodiments of the present invention include software for controlling both the hardware of the general purpose/specialized computer or processor, and for enabling the computer or processor to interact with a human user or other mechanism utilizing the results of embodiments of the present invention. Such software may include, but is not limited to, device drivers, operating systems, and user applications. Ultimately, such computer readable media further includes software for performing embodiments of the present invention, as described above.

Included in the software of the general/specialized computer or processor are software modules for implementing the teachings of the present invention, including, but not limited to, detecting useful images, ranking images in order of usefulness based on how closely each one resembles a "vignette," and communication of results according to the processes of embodiments of the present invention.

Embodiments of the present invention may be conveniently implemented using a conventional general purpose or a specialized digital computer or processor programmed according to the teachings of the present disclosure, as will be apparent to those skilled in the computer art.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that the above described features of detecting and ranking images with numerical ranks in order of usefulness based on vignette score can be incorporated into other types of software applications beyond those described. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

The invention claimed is:

1. A method for identifying a set of query-relevant keywords comprised in one or more documents obtained from a query, wherein the query need not comprise the keywords, comprising:
   a) creating a term-weight matrix $\underline{M}$ comprising one or more document term-weight vectors d, wherein each document term-weight vector d comprises information on the frequency in one of the one or more documents obtained from the terms in the query;
   b) creating an expanded query term-weight vector $q_{expanded}$ from the query term-weight vector q and the term-weight matrix $\underline{M}$, wherein the expanded query term-weight vector $q_{expanded}$ identifies terms related to the query, wherein the query need not comprise the terms within the expanded query term-weight vector $q_{expanded}$;
   c) creating a keyword vector using the document term weight vectors d and the expanded query term-weight vector $q_{expanded}$, wherein the keyword vector identifies terms from the expanded query term-weight vector $q_{expanded}$ that do not occur in at least one of the one or more documents, each term included in the keyword vector having a ranking value;
   d) generating an ordered list of document terms corresponding to the terms included in the keyword vector that occur in at least one of the one or more documents;
   e) selecting keywords from the ordered list of document terms having the highest ranking value; and
   f) highlighting the keywords in the one or more documents.

2. The method of claim 1, wherein the document term-weight vectors d are term-frequency vectors.

3. The method of claim 1, wherein the document term-weight vectors d are term-frequency inverse-document frequency (tf-idf) vectors, whose nth component is computed as a function of a) the term-frequency in document d of the nth term and b) the fraction of the documents that comprise the nth term.

4. The method of claim 3, wherein the function is computed according to the equation $tf\text{-}idf=(1.0+\log(tf))*\log(1/df)$, where tf is a term-frequency for the nth term in document d, and df is the fraction of the documents that comprises the nth term.

5. The method of claim 1, wherein the step of creating a keyword vector using the document term weight vectors d and the expanded query term-weight vector $q_{expanded}$ comprises:
   c1) computing for each document a term-by-term product of the expanded query term-weight vector $q_{expanded}$ and the corresponding document term-weight vector d; and
   c2) assigning the ranking values based on the computed products.

6. The method of claim 1, wherein creating the expanded query term-weight vector $q_{expanded}$ comprises the following steps:
   b1) projecting a query term-weight vector q corresponding to the query terms into latent semantic space, creating a reduced query term-weight vector $q_{reduced}$; and
   b2) expanding the query term-weight vector back out of latent semantic space, creating the expanded query term-weight vector $q_{expanded}$.

7. The method of claim 6, wherein the step of projecting comprises:
   b1(1) approximating the term-weight matrix $\underline{M}$ as a product of three matrices $\underline{U}\ \underline{S}\ \underline{V}'$, wherein $\underline{S}$ is a square diagonal matrix, $\underline{U}$ is a unitary transform matrix, and $\underline{V}$ is a unitary matrix.

8. The method of claim 7, wherein the step of projecting further comprises:
   b1(2) creating a reduced query term-weight vector $q_{reduced}=q*\underline{U}'$.

9. The method of claim 7, wherein the step of expanding the query term-weight vector q comprises:
   b2(1) creating the expanded query term-weight vector $q_{expanded}$ according to the equation $q_{expanded}=q_{reduced}*\underline{U}=\underline{U}*(\underline{U}'*q)$.

10. The method of claim 6, wherein the step of expanding the query term-weight vector q comprises:
    b2(1) computing each of n terms of $q_{expanded}$ by computing a similarity function between a reduced query term-weight vector $q_{reduced}$ and row n of the unitary transform matrix $\underline{U}$.

11. The method of claim 10, wherein the similarity function is a cosine similarity function.

12. The method of claim 1, wherein creating an expanded query term-weight vector $q_{expanded}$ comprises:
    b1) approximating the term-weight matrix $\underline{M}$ as a product of three matrices $\underline{U}\ \underline{S}\ \underline{V}'$, wherein $\underline{S}$ is a square diagonal matrix, $\underline{U}$ is a unitary transform matrix, and $\underline{V}$ is a unitary matrix.

13. The method of claim 12, wherein creating an expanded query term-weight vector $q_{expanded}$ further comprises:
    b2) creating the expanded query term-weight vector $q_{expanded}$ using a query term-weight vector q according to the equation $q_{expanded}=\underline{U}*(\underline{U}'*q)$.

14. The method of claim 1, wherein the document is a text document.

15. The method of claim 1, wherein the document is text associated with a video segment.

16. A method for identifying a set of query-relevant keywords comprised in one or more documents obtained from a query, wherein the query need not comprise the keywords, comprising:
    a) creating a term-weight matrix $\underline{M}$ comprising one or more document term-weight vectors d, wherein each document term-weight vector d comprises information on the frequency in one of the one or more documents obtained from the terms in the query;
    b) projecting a query term-weight vector q corresponding to the query terms into latent semantic space, creating a reduced query term-weight vector $q_{reduced}$;
    c) expanding the query term-weight vector back out of latent semantic space, creating the expanded query term-weight vector $q_{expanded}$, wherein the expanded query term-weight vector $q_{expanded}$ identifies terms related to the query, wherein the query need not comprise the terms within the expanded query term-weight vector $q_{expanded}$;

d) creating a keyword vector using the document term weight vectors d and the expanded query term-weight vector $q_{expanded}$, wherein the keyword vector identifies terms from the expanded query term-weight vector $q_{expanded}$ that do not occur in at least one of the one or more documents, each term included in the keyword vector has a ranking value;

e) generating an ordered list of document terms corresponding to the terms included in the keyword vector that occur in at least one of the one or more documents;

f) selecting keywords from the ordered list of document terms having the highest ranking value; and g) highlighting the keywords in the one or more documents.

17. A method for identifying a set of query-relevant keywords comprised in one or more documents obtained from a query, wherein the query need not comprise the keywords, comprising: TK a) creating a term-weight matrix $\underline{M}$ comprising one or more document term-weight vectors d, wherein each document term-weight vector d comprises information on the frequency in one of the one or more documents obtained from the terms in the query;

b) approximating the term-weight matrix $\underline{M}$ as a product of three matrices $\underline{U}\,\underline{S}\,\underline{V}'$, wherein $\underline{S}$ is a square diagonal matrix, $\underline{U}$ is a unitary transform matrix, and $\underline{V}$ is a unitary matrix;

c) expanding the query term-weight vector back out of latent semantic space, creating the expanded query term-weight vector $q_{expanded}$, wherein the expanded query term-weight vector $q_{expanded}$ identifies terms related to the query, wherein the query need not comprise the terms within the expanded query term-weight vector $q_{expanded}$; and d) creating a keyword vector using the document term weight vectors d and the expanded query term-weight vector $q_{expanded}$, wherein the keyword vector identifies terms from the expanded query term-weight vector $q_{expanded}$ that do not occur in at least one of the one or more documents, each term included in the keyword vector has a ranking value;

e) generating an ordered list of document terms corresponding to the terms included in the keyword vector that occur in at least one of the one or more documents;

f) selecting keywords from the ordered list of document terms having the highest ranking value; and g) highlighting the keywords in the one or more documents.

18. In a computer, a method for identifying a set of query-relevant keywords comprised in one or more documents obtained from a query, wherein the query need not comprise the keywords, comprising:

a) receiving by the user a term-weight matrix $\underline{M}$ created by the computer and comprising one or more document term-weight vectors d, wherein each document term-weight vector d comprises information on the frequency in one of the one or more documents obtained from the terms in the query;

b) receiving by the user an expanded query term-weight vector $q_{expanded}$ created by the computer from the query term-weight vector q and the term-weight matrix $\underline{M}$, wherein the expanded query term-weight vector $q_{expanded}$ identifies terms related to the query, wherein the query need not comprise the terms within the expanded query term-weight vector $q_{expanded}$;

c) receiving by the user a keyword vector created by the computer using the document term weight vectors d and the expanded query term-weight vector $q_{expanded}$, wherein the keyword vector identifies terms from the expanded query term-weight vector $q_{expanded}$ that do not occur in at least one of the one or more documents, each term included in the keyword vector has a ranking value;

d) receiving by the user an ordered list of document terms corresponding to the terms included in the keyword vector that occur in at least one of the one or more documents, the ordered list of document terms being created by the computer;

e) receiving by the user keywords from the ordered list of document terms having the highest ranking value, the keywords having the highest rank selected by the computer; and f) receiving by the user highlighted keywords in the one or more documents.

19. In a computer, a method for identifying a set of query-relevant keywords comprised in one or more documents, wherein the query need not comprise the keywords, comprising:

a) receiving by the user a term-weight matrix $\underline{M}$ comprising information on the frequency in the one or more documents of terms in the selected query and approximated by the computer as a product of three matrices $\underline{U}\,\underline{S}\,\underline{V}'$, wherein $\underline{S}$ is a square diagonal matrix, $\underline{U}$ is a unitary transform matrix, and $\underline{V}$ is a unitary matrix;

b) receiving by the user an expanded query term-weight vector $q_{expanded}$ created by the computer using a query term-weight vector q according to the equation $q_{expanded} = \underline{U}*(\underline{U}'*q)$, wherein the expanded query term-weight vector $q_{expanded}$ identifies terms related to the query, wherein the query need not comprise the terms within the expanded query term-weight vector $q_{expanded}$;

c) receiving by the user a keyword vector created by the computer using the document term weight vectors d and the expanded query term-weight vector $q_{expanded}$, wherein the keyword vector identifies terms from the expanded query term-weight vector $q_{expanded}$ that do not occur in at least one of the one or more documents, each term included in the keyword vector has a ranking value;

d) receiving by the user an ordered list of document terms corresponding to the terms included in the keyword vector that occur in at least one of the one or more documents, the ordered list of document terms being created by the computer;

e) receiving by the user keywords from the ordered list of document terms having the highest ranking value, the keywords having the highest rank selected by the computer; and f) receiving by the user highlighted keywords in the one or more documents.

20. A system for identifying a set of query-relevant keywords comprised in one or more selected documents, wherein the query need not comprise the keywords, comprising a procesor;

a) means for creating a term-weight matrix $\underline{M}$ comprising one or more document term-weight vectors d, wherein each document term-weight vector d comprises information on the frequency in the one or more documents of terms in the selected query;

b) means for creating an expanded query term-weight vector $q_{expanded}$ from the query term-weight vector q and the term-weight matrix $\underline{M}$, wherein the expanded query term-weight vector $q_{expanded}$ identifies terms related to the query, wherein the query need not comprise the terms within the expanded query term-weight vector $q_{expanded}$;

c) means for creating a keyword vector using the document term weight vectors d and the expanded query term-weight vector $q_{expanded}$, wherein the keyword vector identifies terms from the expanded query term-weight vector $q_{expanded}$ that do not occur in at least one of the one or more documents, each term included in the keyword vector having a ranking value;

d) means for generating an ordered list of document terms corresponding to the terms included in the keyword vector that occur in at least one of the one or more documents;

e) means for selecting keywords from the ordered list of document terms having the highest ranking value; and f) means for highlighting the keywords in the one or more documents.

* * * * *